US008229283B2

(12) United States Patent
Ellis (10) Patent No.: US 8,229,283 B2
(45) Date of Patent: Jul. 24, 2012

(54) SYSTEM AND METHOD FOR QUALITY MARKING OF A RECORDING

(75) Inventor: Michael D Ellis, Boulder, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 1511 days.

(21) Appl. No.: 11/097,566

(22) Filed: Apr. 1, 2005

(65) Prior Publication Data

US 2006/0222325 A1 Oct. 5, 2006

(51) Int. Cl.
*H04N 5/76* (2006.01)
*H04N 5/445* (2006.01)
*H04N 7/173* (2006.01)
*H04N 7/16* (2006.01)
*G06F 13/00* (2006.01)
*G06F 3/00* (2006.01)

(52) U.S. Cl. ........ 386/296; 386/297; 386/293; 386/292; 386/291; 386/299; 725/39; 725/46; 725/58; 725/86; 725/87; 725/101; 725/140

(58) Field of Classification Search .................... 386/45, 386/83, 95, 46, 111–112, 125–126, 296, 386/297, 293, 291, 299; 725/39, 46, 58, 725/86, 87, 101, 140, 152
See application file for complete search history.

(56) References Cited

U.S. PATENT DOCUMENTS

| 4,264,924 A | 4/1981 | Freeman |
| 4,264,925 A | 4/1981 | Freeman et al. |
| 4,355,415 A | 10/1982 | George et al. |
| 4,488,179 A | 12/1984 | Krüger et al. |
| 4,573,072 A | 2/1986 | Freeman |
| 4,605,964 A | 8/1986 | Chard |
| 4,694,490 A | 9/1987 | Harvey et al. |
| 4,706,121 A | 11/1987 | Young |
| 4,718,107 A | 1/1988 | Hayes |
| 4,751,578 A | 6/1988 | Reiter et al. |
| 4,847,698 A | 7/1989 | Freeman |
| 4,857,999 A | 8/1989 | Welsh |
| 4,908,707 A | 3/1990 | Kinghorn |
| 4,908,713 A | 3/1990 | Levine |
| 4,930,158 A | 5/1990 | Vogel |
| 4,945,563 A | 7/1990 | Horton et al. |
| 4,959,720 A | 9/1990 | Duffield et al. |

(Continued)

FOREIGN PATENT DOCUMENTS

EP 0424469 5/1991

(Continued)

OTHER PUBLICATIONS

"Digital Video Broadasting (DVB); DVB specification for data broadcasting", European Telecommunications Standards Institute, Draft EN 301 192 V1.2.1 (Jan. 1999).

(Continued)

*Primary Examiner* — Daquan Zhao
(74) *Attorney, Agent, or Firm* — Ropes & Gray LLP (57) ABSTRACT

Systems and methods for identifying a recorded video program are provided. The method may include recording a video and identifying the video as lacking desirable recording attributes. A future occurrence of a transmission of the video may be automatically selected in response to the identification of the video as lacking desirable recording properties. The future occurrence of the transmission of the video may be automatically re-recorded.

14 Claims, 7 Drawing Sheets

U.S. PATENT DOCUMENTS

| | | |
|---|---|---|
| 4,977,455 A | 12/1990 | Young |
| 4,980,713 A | 12/1990 | Fujita et al. |
| 5,012,409 A | 4/1991 | Fletcher et al. |
| 5,038,211 A | 8/1991 | Hallenbeck |
| 5,047,867 A | 9/1991 | Strubbe et al. |
| 5,068,733 A | 11/1991 | Bennett |
| 5,109,279 A | 4/1992 | Ando |
| 5,134,719 A | 7/1992 | Mankovitz |
| 5,151,789 A | 9/1992 | Young |
| 5,172,413 A | 12/1992 | Bradley et al. |
| 5,187,589 A | 2/1993 | Kono et al. |
| 5,195,134 A | 3/1993 | Inoue et al. |
| 5,200,822 A | 4/1993 | Bronfin et al. |
| 5,210,611 A | 5/1993 | Yee et al. |
| 5,223,924 A | 6/1993 | Strubbe |
| RE34,340 E | 8/1993 | Freeman |
| 5,253,066 A | 10/1993 | Vogel |
| 5,285,284 A | 2/1994 | Takashima et al. |
| 5,296,931 A | 3/1994 | Na et al. |
| 5,323,234 A | 6/1994 | Kawasaki |
| 5,335,277 A | 8/1994 | Harvey et al. |
| 5,353,121 A | 10/1994 | Young et al. |
| 5,357,276 A | 10/1994 | Banker et al. |
| 5,410,344 A | 4/1995 | Graves et al. |
| 5,412,720 A | 5/1995 | Hoarty |
| 5,416,508 A | 5/1995 | Sakuma et al. |
| 5,442,389 A | 8/1995 | Blahut et al. |
| 5,461,415 A | 10/1995 | Wolf et al. |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,485,219 A | 1/1996 | Woo et al. |
| 5,488,409 A | 1/1996 | Yuen et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,541,738 A | 7/1996 | Mankovitz |
| 5,543,852 A | 8/1996 | Yuen et al. |
| 5,550,576 A | 8/1996 | Klosterman |
| 5,568,272 A | 10/1996 | Levine |
| 5,576,755 A | 11/1996 | Davis et al. |
| 5,581,614 A | 12/1996 | Ng et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,866 A | 12/1996 | Miller et al. |
| 5,589,892 A | 12/1996 | Knee et al. |
| 5,592,551 A | 1/1997 | Lett et al. |
| 5,596,373 A | 1/1997 | White et al. |
| 5,602,582 A | 2/1997 | Wanderscheid et al. |
| 5,619,274 A | 4/1997 | Roop et al. |
| 5,621,579 A | 4/1997 | Yuen |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,989 A | 6/1997 | Rothmuller |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,367 A | 8/1997 | Yuen |
| 5,666,645 A | 9/1997 | Thomas et al. |
| 5,684,525 A | 11/1997 | Klosterman |
| 5,694,163 A | 12/1997 | Harrison |
| 5,694,381 A | 12/1997 | Sako et al. |
| 5,699,107 A | 12/1997 | Lawler et al. |
| 5,701,383 A | 12/1997 | Russo et al. |
| 5,717,452 A | 2/1998 | Janin et al. |
| 5,721,829 A | 2/1998 | Dunn et al. |
| 5,724,091 A | 3/1998 | Freeman et al. |
| 5,724,203 A | 3/1998 | Kwoh et al. |
| 5,727,060 A | 3/1998 | Young |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,761,607 A | 6/1998 | Gudesen |
| 5,768,528 A | 6/1998 | Stumm |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,790,198 A | 8/1998 | Roop et al. |
| 5,796,952 A | 8/1998 | Davis et al. |
| 5,798,785 A | 8/1998 | Hendricks et al. |
| 5,801,787 A | 9/1998 | Schein et al. |
| 5,802,284 A | 9/1998 | Karlton et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,937 A | 9/1998 | Takahisa et al. |
| 5,818,438 A | 10/1998 | Howe et al. |
| 5,819,019 A | 10/1998 | Nelson |
| 5,828,945 A | 10/1998 | Klosterman |
| 5,850,218 A | 12/1998 | LaJoie et al. |
| 5,880,768 A | 3/1999 | Lemmons et al. |
| 5,883,677 A | 3/1999 | Hofmann |
| 5,909,212 A | 6/1999 | Nishina et al. |
| 5,940,572 A | 8/1999 | Balaban et al. |
| 5,949,954 A | 9/1999 | Young et al. |
| 5,959,688 A | 9/1999 | Schein et al. |
| 5,969,748 A | 10/1999 | Casement et al. |
| 5,974,222 A | 10/1999 | Yuen et al. |
| 5,999,688 A | 12/1999 | Iggulden et al. |
| 6,052,145 A | 4/2000 | Macrae et al. |
| 6,058,238 A | 5/2000 | Ng |
| 6,081,291 A | 6/2000 | Ludwig, Jr. |
| 6,091,883 A | 7/2000 | Artigalas et al. |
| 6,091,884 A | 7/2000 | Yuen et al. |
| 6,115,057 A | 9/2000 | Kwoh et al. |
| 6,122,011 A | 9/2000 | Dias et al. |
| 6,125,231 A | 9/2000 | Yuen et al. |
| 6,141,488 A | 10/2000 | Knudson et al. |
| 6,147,715 A | 11/2000 | Yuen et al. |
| 6,154,771 A | 11/2000 | Rangan et al. |
| 6,157,413 A | 12/2000 | Hanafee et al. |
| 6,167,188 A | 12/2000 | Young et al. |
| 6,177,931 B1 | 1/2001 | Alexander et al. |
| 6,185,360 B1 * | 2/2001 | Inoue et al. ..................... 386/46 |
| 6,208,335 B1 | 3/2001 | Gordon et al. |
| 6,208,799 B1 | 3/2001 | Marsh et al. |
| 6,233,389 B1 | 5/2001 | Barton et al. |
| 6,240,241 B1 | 5/2001 | Yuen |
| 6,247,176 B1 | 6/2001 | Schein et al. |
| 6,275,648 B1 | 8/2001 | Knudson et al. |
| 6,324,338 B1 | 11/2001 | Wood et al. |
| 6,327,418 B1 | 12/2001 | Barton |
| 6,341,374 B2 | 1/2002 | Schein et al. |
| 6,344,878 B1 | 2/2002 | Emura |
| 6,347,400 B1 | 2/2002 | Ohkura et al. |
| 6,373,528 B1 | 4/2002 | Bennington et al. |
| 6,441,832 B1 | 8/2002 | Tao et al. |
| 6,442,332 B1 | 8/2002 | Knudson et al. |
| 6,473,559 B1 | 10/2002 | Knudson et al. |
| 6,498,895 B2 | 12/2002 | Young et al. |
| 6,505,348 B1 | 1/2003 | Knowles et al. |
| 6,564,005 B1 | 5/2003 | Berstis |
| 6,601,074 B1 | 7/2003 | Liebenow |
| 6,681,396 B1 | 1/2004 | Bates et al. |
| 6,701,527 B2 | 3/2004 | Schein et al. |
| 6,756,997 B1 | 6/2004 | Ward, III et al. |

| | | | | | | |
|---|---|---|---|---|---|---|
| 6,760,538 | B1 | 7/2004 | Bumgardner et al. | EP | 0 836 320 | 4/1998 |
| 6,771,886 | B1 | 8/2004 | Mendelsohn | EP | 0843468 | 5/1998 |
| 6,795,639 | B1* | 9/2004 | Lord .................. 386/291 | EP | 0843468 A3 | 5/1998 |
| 6,820,278 | B1 | 11/2004 | Ellis | EP | 0 854 645 | 7/1998 |
| 6,850,693 | B2 | 2/2005 | Young et al. | EP | 0874524 | 10/1998 |
| 7,047,549 | B2 | 5/2006 | Schein et al. | EP | 0874524 A1 | 10/1998 |
| 7,088,910 | B2 | 8/2006 | Potrebic et al. | EP | 0940985 | 9/1999 |
| 7,162,729 | B2 | 1/2007 | Schein et al. | EP | 0940985 A2 | 9/1999 |
| 7,197,143 | B2 | 3/2007 | Duerr et al. | EP | 1187467 A2 | 3/2002 |
| 7,209,632 | B2* | 4/2007 | Nono .................. 386/243 | EP | 1292137 | 3/2003 |
| 7,209,640 | B2 | 4/2007 | Young et al. | GB | 2 229 595 | 9/1990 |
| 7,330,693 | B1 | 2/2008 | Goss | JP | 10-042242 | 2/1998 |
| 7,430,362 | B2 | 9/2008 | Kudo | JP | 10-112087 | 4/1998 |
| 7,477,832 | B2 | 1/2009 | Young et al. | JP | 10-164487 | 6/1998 |
| 7,543,320 | B2 | 6/2009 | Schein et al. | JP | 11-136615 A | 5/1999 |
| 7,765,235 | B2 | 7/2010 | Day et al. | JP | 11-313280 A | 11/1999 |
| 7,840,112 | B2 | 11/2010 | Rao | JP | 2000-268441 | 9/2000 |
| 2001/0028782 | A1 | 10/2001 | Ohno et al. | JP | 2001-268503 | 9/2001 |
| 2002/0040475 | A1 | 4/2002 | Yap et al. | JP | 2004-07592 | 1/2004 |
| 2002/0059610 | A1* | 5/2002 | Ellis .................. 725/58 | JP | 2004-23326 | 1/2004 |
| 2002/0059621 | A1 | 5/2002 | Thomas et al. | JP | 2004-140527 | 5/2004 |
| 2002/0116712 | A1 | 8/2002 | Schein et al. | JP | 2005-236910 | 9/2005 |
| 2002/0144279 | A1 | 10/2002 | Zhou | TW | 247388 | 10/1994 |
| 2002/0169712 | A1 | 11/2002 | Ginzboorg et al. | WO | WO 88/04507 | 6/1988 |
| 2002/0174430 | A1 | 11/2002 | Ellis et al. | WO | WO 90/00847 | 1/1990 |
| 2002/0174433 | A1 | 11/2002 | Baumgartner et al. | WO | WO 91/00670 | 1/1991 |
| 2003/0009766 | A1 | 1/2003 | Marolda | WO | WO 91/07050 | 5/1991 |
| 2003/0033601 | A1 | 2/2003 | Sakata et al. | WO | WO 92/04801 | 3/1992 |
| 2003/0067554 | A1 | 4/2003 | Klarfeld et al. | WO | WO 92/22983 | 12/1992 |
| 2003/0118323 | A1 | 6/2003 | Ismail et al. | WO | WO 93/04473 | 3/1993 |
| 2003/0126607 | A1 | 7/2003 | Phillips et al. | WO | WO 93/08542 | 4/1993 |
| 2003/0149980 | A1 | 8/2003 | Hassel et al. | WO | WO 93/23957 A1 | 11/1993 |
| 2003/0149988 | A1 | 8/2003 | Ellis et al. | WO | WO 95/01058 | 1/1995 |
| 2003/0198462 | A1 | 10/2003 | Bumgardner et al. | WO | WO 95/04431 | 2/1995 |
| 2003/0206719 | A1 | 11/2003 | Bumgardner et al. | WO | WO 95/11567 | 4/1995 |
| 2003/0208763 | A1 | 11/2003 | McElhatten et al. | WO | WO 95/18449 | 7/1995 |
| 2003/0237097 | A1* | 12/2003 | Marshall et al. .......... 725/105 | WO | WO 95/31069 | 11/1995 |
| 2004/0008971 | A1 | 1/2004 | Young et al. | WO | WO 95/32584 | 11/1995 |
| 2004/0022523 | A1* | 2/2004 | Duerr et al. .............. 386/94 | WO | WO 95/32585 | 11/1995 |
| 2004/0049794 | A1 | 3/2004 | Shao et al. | WO | WO 95/32587 | 11/1995 |
| 2004/0103434 | A1 | 5/2004 | Ellis | WO | WO 96/09721 | 3/1996 |
| 2004/0117845 | A1 | 6/2004 | Karaoguz et al. | WO | WO 96/13932 | 5/1996 |
| 2004/0125779 | A1 | 7/2004 | Kelton et al. | WO | WO 96/17473 | 6/1996 |
| 2004/0128686 | A1 | 7/2004 | Boyer et al. | WO | WO 96/25821 | 8/1996 |
| 2004/0154040 | A1 | 8/2004 | Ellis | WO | WO 96/26605 | 8/1996 |
| 2004/0156614 | A1 | 8/2004 | Bumgardner et al. | WO | WO 96/27982 | 9/1996 |
| 2004/0181814 | A1 | 9/2004 | Ellis et al. | WO | WO 96/33572 | 10/1996 |
| 2004/0187150 | A1 | 9/2004 | Gonder et al. | WO | WO 96/34491 | 10/1996 |
| 2004/0210932 | A1 | 10/2004 | Mori et al. | WO | WO 96/36172 | 11/1996 |
| 2005/0015804 | A1 | 1/2005 | LaJoie et al. | WO | WO 96/37075 | 11/1996 |
| 2005/0044567 | A1 | 2/2005 | Young et al. | WO | WO 96/41472 | 12/1996 |
| 2005/0050218 | A1 | 3/2005 | Sheldon | WO | WO 96/41478 | 12/1996 |
| 2005/0081242 | A1* | 4/2005 | Kwok .................. 725/58 | WO | WO 97/13368 | 4/1997 |
| 2005/0105528 | A1 | 5/2005 | Kobayashi et al. | WO | WO 97/30546 | 8/1997 |
| 2005/0160461 | A1 | 7/2005 | Baumgartner et al. | WO | WO 97/31479 | 8/1997 |
| 2005/0193015 | A1 | 9/2005 | Logston et al. | WO | WO 97/32434 | 9/1997 |
| 2005/0204388 | A1 | 9/2005 | Knudson et al. | WO | WO 97/33434 | 9/1997 |
| 2005/0234992 | A1 | 10/2005 | Haberman | WO | WO 97/34413 | 9/1997 |
| 2005/0235323 | A1 | 10/2005 | Ellis et al. | WO | WO 97/34414 | 9/1997 |
| 2005/0238168 | A1 | 10/2005 | Lee et al. | WO | WO 97/40623 | 10/1997 |
| 2005/0246759 | A1* | 11/2005 | Yoshida .................. 725/138 | WO | WO 97/42763 | 11/1997 |
| 2006/0140584 | A1 | 6/2006 | Ellis et al. | WO | WO 97/46016 | 12/1997 |
| 2006/0174270 | A1 | 8/2006 | Westberg et al. | WO | WO 97/46943 | 12/1997 |
| 2007/0071399 | A1 | 3/2007 | Ellis | WO | WO 97/47124 | 12/1997 |
| 2007/0104456 | A1 | 5/2007 | Craner | WO | WO 97/48228 | 12/1997 |
| 2007/0168539 | A1 | 7/2007 | Day | WO | WO 97/48230 | 12/1997 |
| 2008/0066016 | A1 | 3/2008 | Dowdy et al. | WO | WO 97/49237 | 12/1997 |
| 2008/0077957 | A1 | 3/2008 | Schein et al. | WO | WO 97/49242 | 12/1997 |
| 2008/0092168 | A1 | 4/2008 | Logan et al. | WO | WO 98/01995 | 1/1998 |
| | | | | WO | WO 98/06219 | 2/1998 |
| | | FOREIGN PATENT DOCUMENTS | | WO | WO 98/07277 | 2/1998 |
| EP | | 0424469 B1 | 5/1991 | WO | WO 98/10589 | 3/1998 |
| EP | | 0 682 452 | 11/1995 | WO | WO 98/12872 | 3/1998 |
| EP | | 721253 | 10/1996 | WO | WO 98/16056 | 4/1998 |
| EP | | 0749242 | 12/1996 | WO | WO 98/17064 | 4/1998 |
| EP | | 0753964 | 1/1997 | WO | WO 98/26594 | 6/1998 |
| EP | | 0762756 | 3/1997 | WO | WO 98/26596 | 6/1998 |
| EP | | 0763938 | 3/1997 | WO | WO 98/38831 | 9/1998 |
| EP | | 0763938 A2 | 3/1997 | WO | WO 98/39893 | 9/1998 |

| | | |
|---|---|---|
| WO | WO 98/47279 | 10/1998 |
| WO | WO 98/47283 | 10/1998 |
| WO | WO 98/47287 | 10/1998 |
| WO | WO 98/47289 | 10/1998 |
| WO | WO 98/48566 A2 | 10/1998 |
| WO | WO 98/47283 | 11/1998 |
| WO | WO 99/03267 | 1/1999 |
| WO | WO 99/52279 | 10/1999 |
| WO | WO 99/60790 | 11/1999 |
| WO | WO 99/66725 | 12/1999 |
| WO | WO 00/04706 A2 | 1/2000 |
| WO | WO 00/07368 | 2/2000 |
| WO | WO 00/08852 | 2/2000 |
| WO | WO 00/16548 | 3/2000 |
| WO | WO 00/40026 A1 | 7/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/67475 | 11/2000 |
| WO | WO 01/22729 | 3/2001 |
| WO | WO 01/76239 | 10/2001 |
| WO | WO 01/91458 | 11/2001 |
| WO | WO 03/041410 A1 | 5/2003 |
| WO | WO 04/002156 A1 | 12/2003 |
| WO | WO 2004/019602 A2 | 3/2004 |
| WO | WO 2007/078739 A2 | 7/2007 |

OTHER PUBLICATIONS

DVR Recording as implemented in TVGI A23 program guide (Aug. 24, 2004).

The New York Times, "2 Makers Plan Introductions of Digital VCR" by John Markoff, Mar. 29, 1999.

Hofmann, Neumann, Oberlies, and Schadwinkel, "Videotext Programmiert Videorecorder," Rundfunktechnische Mitteilungen, Nov.-Dec. 1982, pp. 254-257 (translation attached).

"Electronic Programme Guide (EPG); Protocol for a TV Guide using electronic data transmission" by European Telecommunication Standards Institute, May 1997, Valbonne, France, publication No. ETS 300 707.

"Windows 98 Feature Combines TV, Terminal and the Internet," *New York Times*, Aug. 18, 1998.

"Digital Video Broadcasting (DVB); DVB specification for data broadcasting", European Telecommunications Standards Institute, Draft EN 301 192 V1.2.1 (Jan. 1999).

Rewind, replay and unwind with new high-tech TV devices, by Lawrence J. Magid, *LA Times*. This document was printed from the Internet on Jun. 6, 1999 and bears a date of May 19, 1999.

http://www.iapplianceweb.com/story/OEG20040510N0003BC.htm (May 11, 2004).

Inside I-Guide User's Manual (Aug. 24, 2004).

TivoToGo (printed Mar. 8, 2006).

Davidson, Ken, "CEBus: A New Standard in Home Automation" Circuit Cellar Ink, pp. 40-52 (1989).

Declaration of Rosetta Roqers Under 37 CFR 1.131 in U.S. Appl. No. 09/393,955.

Electronic Program Guide Via Internet, Research Disclosure Bulletin, No. 385:276, May 1996, p. 276.

Hofmann, J., "The Consumer Electronic Bus: An Integrated Multi-Media LAN for the Home," International Journal of Digital and Analog Communication Systems, vol. 4, No. 2, 1991, pp. 77-86.

International Search Report for International Application No. PCT/US2006/012260 dated Oct. 12, 2006.

IS-60.3 Physical Layer and Medium Specifications. Part 3-CX Physical Layer & Medium Specification, CX Specification, Revised Mar. 19, 1992, Table of Contents (2 pp.) and pp. 1-41.

O'Brien, Jr., T. E., "Physical and Media Specifications of the CXBus," IEEE Transactions on Consumer Electronics, vol. 37, No. 3, Aug. 1991, pp. 357-366.

Sheth et al., VideoAnywhere: A system for Searching and Managing Distrbuted Video Assets, *SIGMOD Record* 28(1): 104-109 (1999).

StarSight User's Manual.

\* cited by examiner

SYSTEM AND METHOD FOR QUALITY MARKING OF A RECORDING

BACKGROUND OF THE INVENTION

This invention is related to systems and methods for recording videos and more particularly, systems and methods for identifying, marking and re-recording videos that were recorded lacking desirable recording attributes.

Recording devices, such as digital video recording (DVR) devices are well known in the art. DVR systems may be programmed to record television programs when they are broadcast. However, a user may find that a recorded program lacks desirable recording attributes. For example, the recorded program may be interrupted, missing the beginning or the end of the program, or may have incorrect content. Because DVR systems are typically automatically configured to avoid recording duplicate copies of the same program, the DVR system may not record an alternate broadcast of the program. The system may then miss a re-broadcast of the program, leaving the user with a program lacking desirable recording attributes and no easy means of acquiring a copy of the program with desirable recording attributes.

Accordingly, it would be desirable to provide video recording systems and methods for identifying programs lacking desirable recording properties and re-recording re-broadcasts of the program. It would further be desirable to provide systems and methods for defining recording options for future recordings based on modifications of recording options of previously recorded programs.

SUMMARY OF THE INVENTION

These and other objects of the present invention are accomplished in accordance with the principles of the present invention by providing an interactive television application coupled with a recording device. The application may identify recorded programs lacking desirable recording attributes and record future broadcasts of the identified programs. A video may lack desirable recording attributes because, for example, it has incorrect program content, it is missing the start or the end of a program, it was interrupted, or it has poor audio or video quality.

In some embodiments, the recorded video may be identified as lacking desirable recording attributes by a user marking. In some embodiments, the interactive television application may automatically determine that the recorded video lacks desirable recording attributes and identify it as such. In response to the identification, a future occurrence of a transmission of the video may be automatically selected and re-recorded.

In some embodiments, the interactive television application may record a future occurrence of the program that minimally impedes the execution of all scheduled future recordings. For example, the interactive television application may identify all future occurrences of a transmission of the video, identify all scheduled future recordings, and identify the future occurrence of the transmission of the video that minimally impedes the execution of all scheduled future recordings.

In some embodiments, recording options, such as quality setting, start time or end time, may be modified for the re-recording of the video. In some embodiments, recording options may be modified based on prior recordings to potentially avoid the need to re-record a program. For example, category information (e.g., episode of a series, program title, sports program, etc.) of a video scheduled to be recorded may be compared with the category information of previously re-recorded videos. The recording options of the video scheduled to be recorded may then be modified based on the recording options of the re-recorded videos.

For example, a prior re-recorded program which was a Monday Night Football game was originally recorded with the first four minutes of the broadcast missing. For the scheduled re-recording, the start time was modified to add a five minute buffer to the beginning of the program. The five minute buffer may then be added to all other scheduled recordings of Monday Night Football in an attempt to avoid the original problem of missing the first four minutes of the broadcast.

In some embodiments, only a portion of the video may be re-recorded. That portion may be combined with all or part of the original recorded video. In another embodiment, a new copy of the video may be re-recorded, and the original copy may be deleted.

In some embodiments, a video-on-demand program may be downloaded with particular recording attributes. In response to identifying the downloaded recording as lacking desirable recording attributes, the program may be downloaded again to provide the user with a program having desirable recording attributes.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Figure 1:
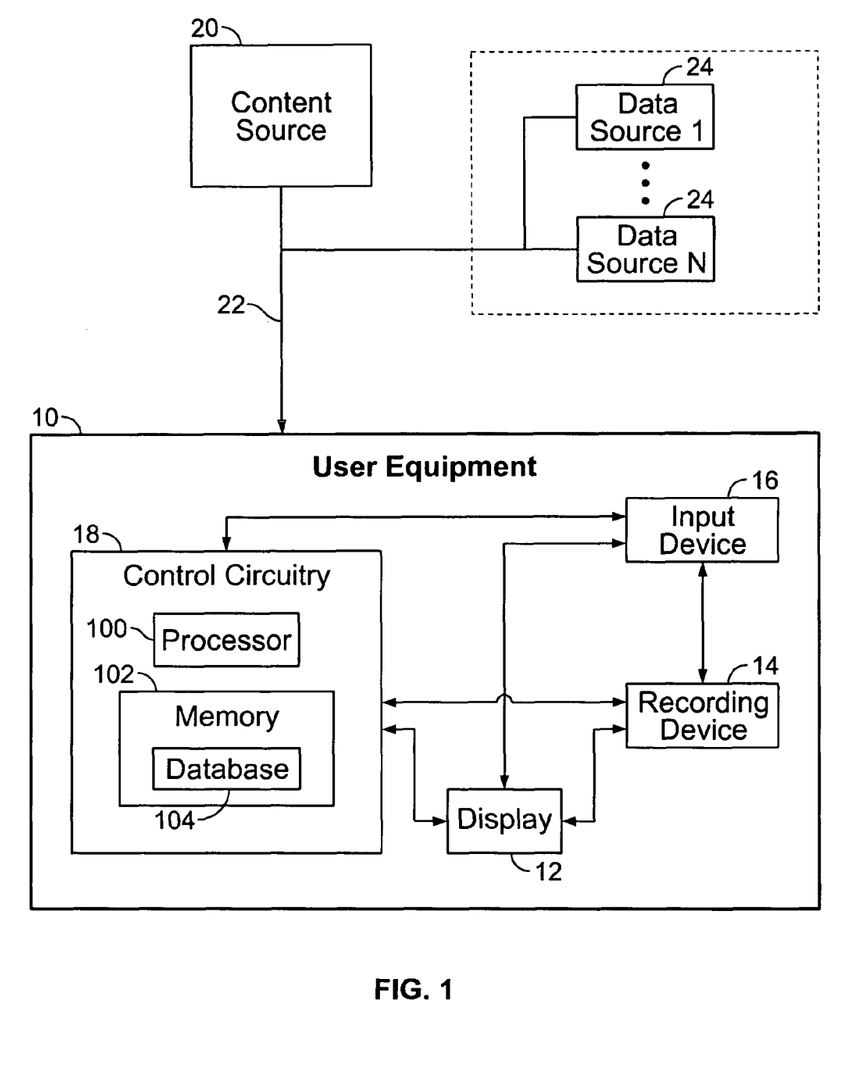
FIG. 1 is a diagram of an illustrative interactive television system in accordance with one embodiment of the present invention.

Illustrative interactive television system 1 in accordance with the principles of the invention is shown in FIG. 1. User equipment 10 receives content in the form of signals from content source 20 over communications path 22.

Content source 20 may be any suitable content source such as, for example, a cable system headend, satellite television distribution facility, television broadcast facility, server, or any other suitable facility for originating or distributing content. Content source 20 may be configured to transmit signals over any suitable communications path 22 including, for example, a satellite path, a fiber-optic path, a cable path, or any other suitable wired or wireless path. Signals 22 may carry any suitable content such as, for example, television program, internet, music, news, television program listings, or any other suitable content.

User equipment 10 may include any suitable user equipment including, for example, computer equipment (e.g., a personal computer with a television card (PCTV)), television equipment, or any other suitable equipment. The television equipment may include a television, set-top box, recording device, video player, user input device (e.g., remote control, keyboard, mouse, touch pad, touch screen, voice recognition interface, etc.) or any other suitable device that may be construed as television equipment. In the example of FIG. 1, user equipment 10 includes control circuitry 18, display device 12 and recording device 14, which may be implemented as separate devices or in a single device, and user input device 16. An interactive television application or system (e.g., an interactive program guide) may be implemented in the user equipment to display, on display device 12, the content transmitted by content source 20 over communications path 22, and to provide interactive television application features. Control circuitry 18 adapted to receive user instructions and execute the operations of the interactive television application.

Display device 12 may be any suitable device including, for example, a television monitor and a computer monitor. Display device 12 may also be configured to provide for the output of audio.

Recording device 14 may be any of a personal video recorder, digital video recorder (DVR), video cassette recorder (VCR), DVD-recorder, or any other suitable video recorder. Recording device 14 may include any suitable number of tuners, and in a preferred embodiment, may include at least two. Recording device 14 may be controlled by the interactive television application.

Control circuitry 18 may be adapted to receive user instructions and execute the operations of the interactive television application. Control circuitry 18 may include one or more tuners (e.g., analog or digital tuners), decoders (e.g., MPEG decoders), processors 100, memory 102 (e.g., RAM and hard disks), communications circuitry (e.g., cable modem circuitry), input/output circuitry (e.g., graphics circuitry) and connections to the various devices of user equipment 10, and any other suitable component for providing analog or digital television programming, program recording, and television features, only some of which are shown. Control circuitry 18 may be configured to execute the instructions of the interactive television application from memory. In one embodiment, control circuitry 18 may be included as part of one of the devices of user equipment 10 such as, for example, part of recording device 14, display device 12, or any other device (e.g., set-top box, television, video player, etc.).

User equipment 10 may receive interactive television application data from one or more data sources 24. The data from data sources 24 may be stored by control circuitry 18 in memory 102 (e.g., RAM or hard disk). Data sources 24 may provide data for a particular type of content, or for a particular application. For example, one data source 24 may provide data for non-on-demand assets (e.g., non-pay and pay-per-view television programs), and another may provide data for on-demand assets (e.g., video-on-demand (VOD) programs). These types of data (whether or not provided by a single source) may include, for example, program listings. Both of these types of data may be used by an interactive television application implemented on user equipment 10. Another data source 24 may, for example, provide data for another application running on user equipment 10 (e.g., a home shopping application). In some embodiments, data sources 24 may provide data to the interactive television application using a suitable client/server approach. There may be one server per data source, or, in some embodiments, a single server may communicate as a proxy between user equipment 10 and various data sources 24.

Memory 102 may store database 104 of data from data sources 24 and other data for use by the interactive television application (e.g., user profiles, recorded program lists, equipment settings, or other suitable information). In some embodiments, database 104 may include entries corresponding to recorded programs and programs scheduled for recording in which attributes related to those programs may be stored. In some embodiments, database 104 may be included in any portion of user equipment 10, and may be a standalone device. In some embodiments, the database may reside outside of user equipment 10 (e.g., on a remote server).

Computer instructions from the interactive television application may also be stored in memory 102. Processor 100 may execute these instructions to operate on the data stored in memory 102 and thereby provide the interactive television application functions.

Figure 2:
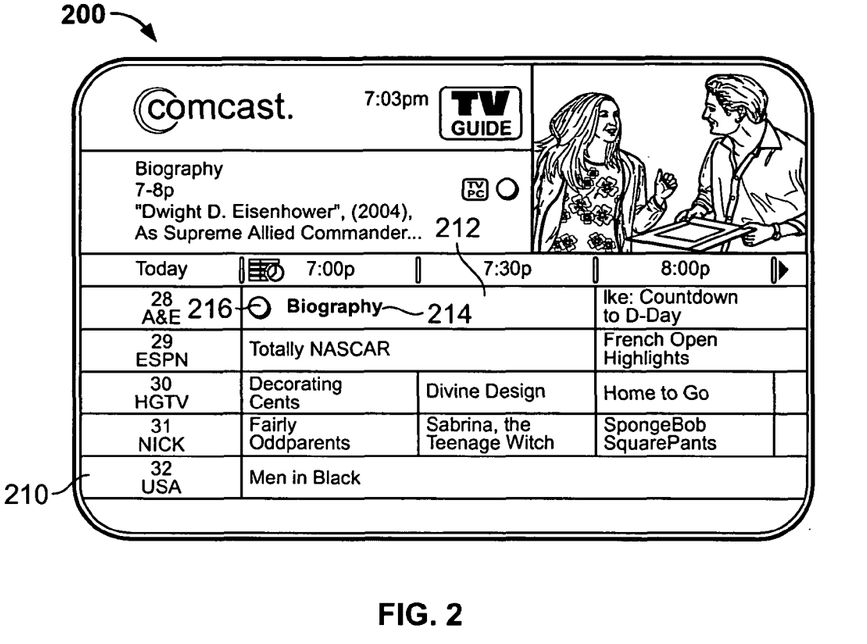
FIG. 2 shows an illustrative display screen showing television listings in accordance with one embodiment of the present invention.

An illustrative program guide screen 200 that may be displayed on display 12 is shown in FIG. 2. The user may access program guide screen 200 by any suitable means such as, for example, pressing a "menu," "guide," or other suitable key on user input device 16, navigating from another program guide screen or menu, or by any other suitable means known in the art. Program guide screen 200 may contain a grid or list of program listings 210, which may include program titles, channels, scheduled broadcast times, and any other suitable program information. Highlight region 212 may be used to select a desired program listing 214. The user may control highlight region 212 using direction keys from the user input device, or any other suitable means.

To schedule the recording of a program using recording device 14, a user may highlight a desired program, as shown in FIG. 2 where "Biography" on channel 28 is highlighted, and press a "Record" key or key sequence, or select a "Record" icon from the screen using user input device 16. If the program is currently being broadcast, the recording commences as soon as the user's instructions are received. If recording device 14 includes a buffer for storing the video content from the currently tuned to channel temporarily prior to the user instruction to record, the recording device may add the video from the buffer to the recording.

Once the user has scheduled the recording of a particular program, the listing corresponding to the program may be marked by an icon such as first icon 216 (FIG. 2) indicating that the program is scheduled to be recorded. Once the program is recorded, the listing may be marked with a second icon that is identical or different from the first icon, indicating that the program has been recorded.

In an embodiment in which recording device 14 includes two tuners, a user may record a second program at the same time as a first program is being recorded. To do so, a user may instruct the first tuner of recording device 14 to tune to the channel of the first program, and instruct the second tuner to simultaneously tune to the channel of the second program.

Figure 3:
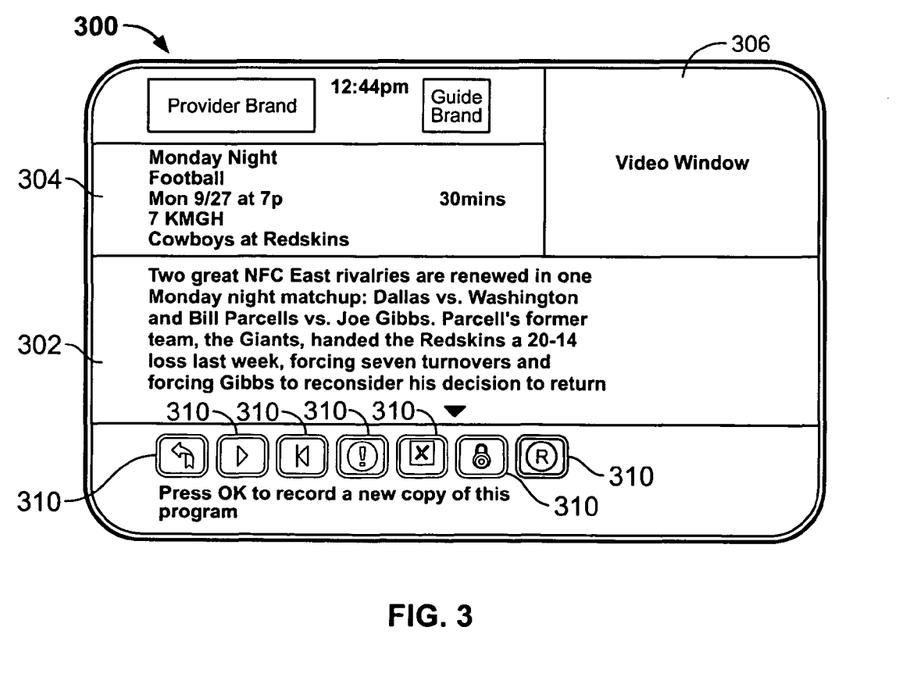
FIG. 3 shows an illustrative display screen showing information relating to a television program in accordance with one embodiment of the present invention.

A user may request additional information regarding highlighted listing 214 by pressing an "Information" key or key sequence on user input device 16, navigate from another program guide screen, or by any other suitable means. In response to the user request, information screen 300, which may include detailed information section 302, may be displayed, as shown in FIG. 3. Program guide screen 300 may include section 304, which may include basic program information, including the program title, time and channel, and video window 306. Screen 300 may include selectable icons 310. Some or all of icons 310 may include text descriptions. Icons 310 may include icons for recording, series recording, parental lock, or any other suitable action. A user may schedule the recording of the program by pressing a "Record" key or key sequence, selecting a "Record" icon from the screen using user input device 16, or by any other suitable means.

Figure 4:
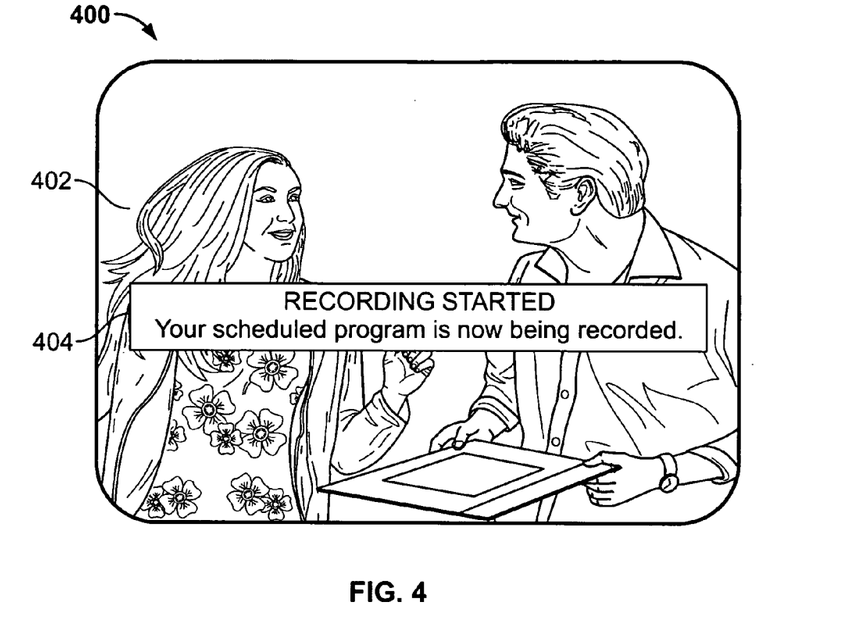
FIG. 4 shows an illustrative display screen showing a television program in full screen after a recording has commenced in accordance with one embodiment of the present invention.

FIG. 4 shows an illustrative television screen 400 that may be displayed on display 12. To record a currently broadcast program from full screen view 402, a user may press a "Record" key or key sequence on user input device 16, or use any other suitable means. A pop-up notice such as pop-up notice 404 may appear to confirm that recording has begun. In another embodiment, the user may be given the opportunity to confirm or cancel the recording by selecting, for example, a corresponding option from a pop-up menu. Pop-up notice 404 may be displayed in response to receiving a confirmation to commence recording from the user. In one embodiment, pop-up notice 404 may appear automatically when a previously-scheduled recording commences.

Figure 5:
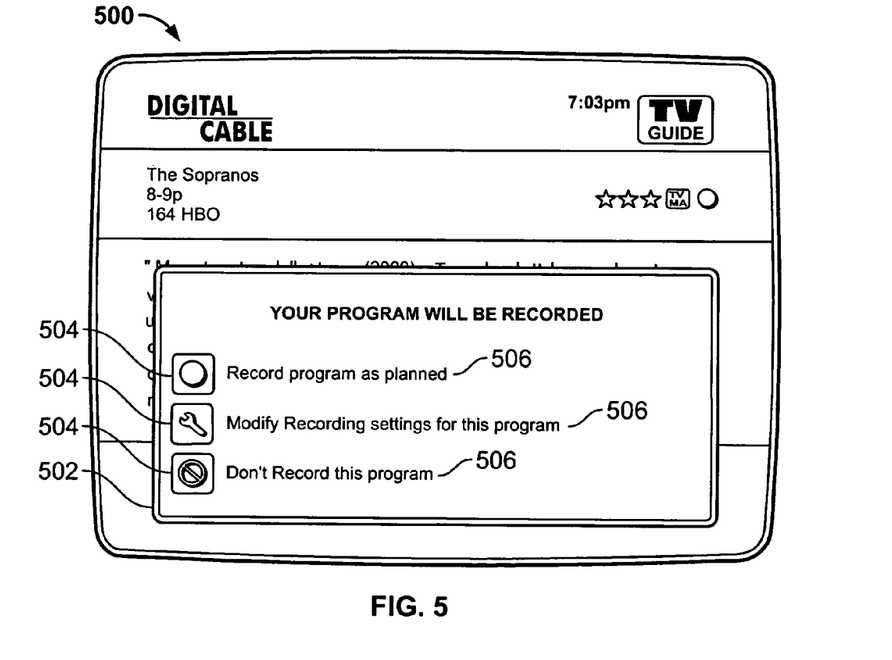
FIG. 5 shows an illustrative display screen showing how a user may record a program in accordance with one embodiment of the present invention.

Program guide screen 500 shows pop-up menu 502, as shown in FIG. 5, which may appear in response to a user instruction to record a program from program listing screen 200, information screen 300, full screen view 400, or from any other suitable location in the interactive television application. Pop-up menu 502 may include a notice confirming the scheduling of the recording. Pop-up menu 502 may also include selectable icons 504. Icons 504 may include written descriptions 506. In one embodiment, one of icons 504 may be a "recording options" icon. Recording options that a user may modify may include how long to save the recording, recording quality, and start and end times.

Figure 6:
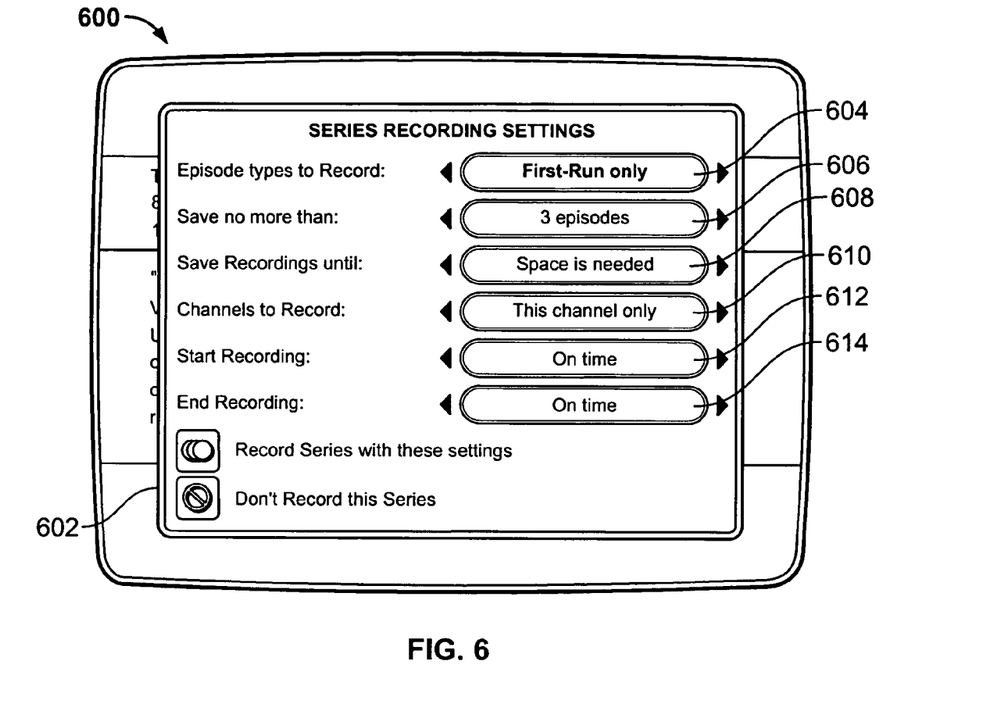
FIG. 6 shows an illustrative display screen showing recording options in accordance with one embodiment of the present invention.

In one embodiment, a user may select to schedule the recording of an episode of a series. The interactive television application may be configured to identify the series and provide the user with the option of recording multiple episodes. Options 602 specific to series recording may be displayed, for example in pop-up menu 600, as shown in FIG. 6. Options 602 may include episode type 604, number of episodes to save 606, how long to save the episodes 608, channels to record 610, start time 612 and end time 614. In some embodiments, only some options may be displayed, but the user may be given the option to have additional available options displayed. Alternatively, the user may specify that the program is an episode of a series, and select the series recording options from the recording menu.

Figure 7:
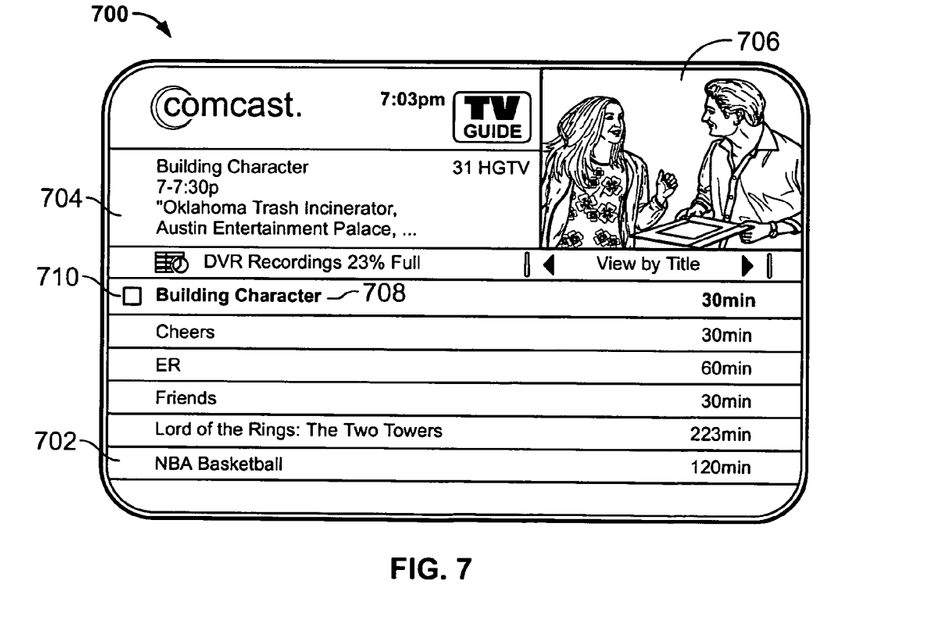
FIG. 7 shows an illustrative display screen showing a listing of recorded programs in accordance with one embodiment of the present invention.

Recorded programs or videos may be stored by recording device 14. In some embodiments, the recorded programs may be stored in recording device 14, another device within user equipment 10, or on a network element outside of user equipment 10. A user may view the stored programs by accessing menu 700, as shown in FIG. 7, which may be accessed by pressing a "Recorded Programs Menu" key or key sequence, selecting a "Recorded Programs Menu" icon from the screen using user input device 16, or by any other suitable means. Menu 700 may include listings of recorded programs 702, information portion 704 and video window 706. Listings 702 may include program length, program title, channel number, or any other suitable information. A program entry from listings 702 may be identified as having specific desirable recording qualities, or as lacking desirable recording qualities.

Programs may be identified as having or lacking desirable recording attributes in a number of ways. In some embodiments, the interactive television application may automatically determine that a program has or lacks desirable recording attributes. In some embodiments, the interactive television application may determine the specific desirable recording attributes missing (e.g., missed start or end of program, recording interrupted, etc.), and change a database entry corresponding to those specific desirable recording attributes. The automatic determining may include an indication (e.g., visual, audio, etc.) that a desirable recording attribute is present or lacking.

The interactive television application may automatically determine that a recorded program lacks desirable recording attributes by monitoring a user's actions. For example, a user may cause a recorded program to lack desirable recording attributes by instructing recording device 14 to record an incorrect program, changing the channel of the tuner of the recording device while the program was being recorded, turning the recording device on after the program has started, turning the recording device off before the end of the program, specifying low quality, or performing any other user operation causing desirable recording attributes to be lacking. Alternatively, the interactive television application may automatically determine that a recorded program lacks desirable recording attributes by monitoring factors outside the user's control. Such factors may include, for example, incorrect television program guide data used to identify the desired program, an interrupted recording (e.g., by a power failure, an emergency alert, a signal outage, or any other factor), or any other factor causing the desirable recording attributes to be lacking.

In some embodiments, a program may be identified as having or lacking desirable recording attributes by receiving a user marking. In response to receiving the marking from the user, the interactive television application may change a database entry corresponding to the program to reflect the presence or absence of desirable recording attributes. In some embodiments, the user marking may include an indication (e.g., visual, audio, etc.) that a desirable recording attribute is present or lacking.

For example, a user may determine that recorded show "Building Character" lacks desirable recording attributes, and mark the program by selecting its listing. In response to receiving the marking from the user, the interactive television application may display a visual indication that the recorded show lacks desirable recording attributes on listing 708 from recorded program listings 702 corresponding to the show using recording quality icon 710. In response to receiving the marking from the user, the interactive television application may change a database entry of "Building Character" in database 104 to reflect the absence of desirable recording attributes (e.g., set a flag, change a value in a field, etc.).

As another example, a user watching a recorded program may determine that the recording lacks desirable recording attributes while playing back the recorded program. The user may determine that the recording is of a different program than the scheduled program corresponding to the selected listing, is missing the beginning or the end of the program, is interrupted, has undesirable video or audio quality, or has any other undesirable recording attribute. In response to the determination, the user may mark the program by selecting a suitable icon in the interactive television application.

In some embodiments, the user may mark the program as lacking desirable recording attributes by selecting an icon on a program information screen for the recorded program (e.g., screen 300 of FIG. 3). The screen may include a selectable icon for marking the program as lacking a desirable recording attribute in addition to selectable icons for playback, deleting, etc.

Upon identifying a program as having or lacking desirable recording attributes, the interactive television application may change a database entry corresponding to the recorded program in a database such as database 104 to reflect the presence or absence of the desirable recording attributes. For example, the database may be modified by setting or clearing a flag, specifying a value for a field in the database entry, or by any other suitable database manipulation. In some embodiments, the modification to the database entry may be specific to a particular desirable recording attribute that is present or lacking. In some embodiments, the modification to the database entry may include information regarding the level to which a desirable recording attribute is present or lacking.

The interactive television application may be configured to read the database to determine whether a recorded program has or lacks desirable recording attributes. Upon selection of the database entry corresponding to the program, the relevant data may be read, and the desirable recording attributes lacking or present may be identified. In some embodiments, a flag may be read. In other embodiments, the value of a particular field in the database entry may be read Displayed program listings for recorded programs may include an indication that a desirable recording attribute is present or lacking. For example, the indication may include any suitable visual indication (e.g., an icon, a highlight, a change in color of the listing or of the background, different shading, additional text, etc.). In one embodiment, the indication may include icon 710 and text explaining which particular desirable recording attribute is lacking. Alternatively, the indication may include any suitable audio indication (e.g., an audio clip that is played when the user highlights the particular listing, etc.).

The interactive television application may be configured to search for future transmissions of programs lacking desirable recording attributes from the program schedule data provided by data sources 24. The interactive television application may search through program schedule data provided by data source 24 to identify all future transmissions of the program. If a future transmission is identified (e.g., by finding the program in the program schedule data), the interactive television application may select the future transmission and schedule it for recording. If multiple future transmissions are identified, the interactive television application may select the future transmission that minimally impacts the recording of other programs previously scheduled for recording. The search for future transmissions, as well as the scheduling of the re-recording, may be done in response to corresponding user instructions or automatically.

The interactive television application may select for recording the future transmission of a program based on the results of a conflict check. The interactive television application may select a future transmission by, for example, identifying the programs previously scheduled for recording, comparing the different transmission times, and selecting the future transmission that minimally impedes the recording of previously scheduled programs. The interactive television application may compare the time of a future transmission with the typical viewing habits of the user, and select a future transmission that minimally overlaps with the typical viewing habits of the user. The interactive television application may compare the time of the proposed future transmission with other known uses of the user equipment, and select a future transmission that minimally impedes the other known uses. In the case of a conflict, the interactive television application may bring the conflict to the user's attention for resolution. Alternatively, the system may prioritize the scheduled recordings based on any suitable prioritization criteria. In some embodiments, the re-recording may be given the same priority as the original program, or alternatively, the user may specify any suitable priority for the re-recording.

Figure 8:
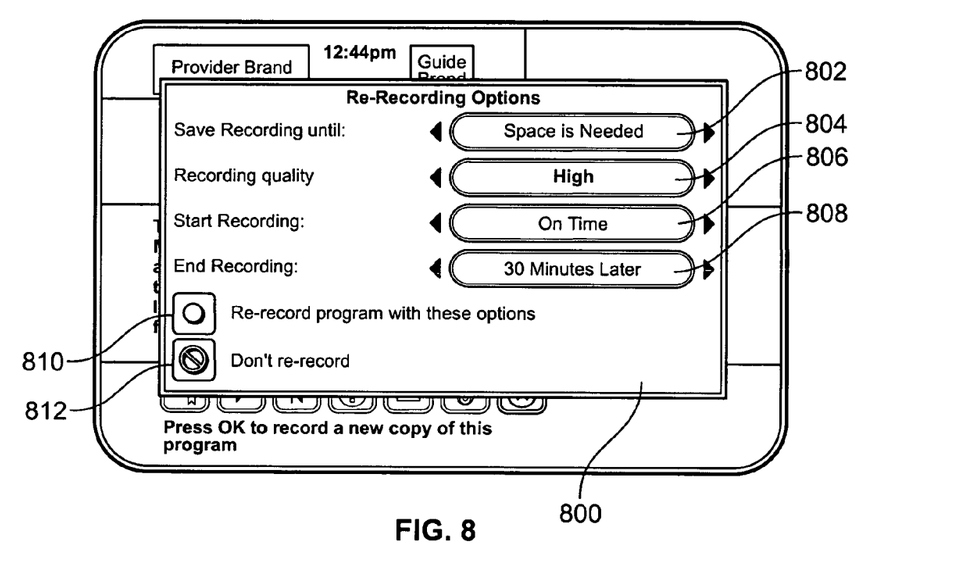
FIG. 8 shows an illustrative display screen showing re-recording options in accordance with one embodiment of the present invention.

To avoid having the re-recorded program lack the same desirable attributes as the originally recorded program, a user may change the recording options for the scheduled re-recording. A user may navigate to a re-recording options menu from the recorded programs listing, information screen, full screen video, or any other suitable screen in the interactive television application. A menu with re-recording options such as pop-up menu 800 shown in FIG. 8 may provide a user with the opportunity to change the re-recording options. The user may modify the length of time to save the recording 802, recording quality 804, recording start time 806, recording end time 808, or any other recording option. Once the user has changed the recording options, the user may either decide to re-record the program with the specified recording options by selecting corresponding icon 810, or decide not to re-record the program by selecting corresponding icon 812.

Alternatively, the interactive television application may automatically re-record the program with recording options based on the database entry of the recorded program, which may have been changed when the program was identified as lacking desirable recording attributes. The interactive television application may determine to re-record the program with the same recording options if the desirable attributes lacking were not related to the recording options (e.g., interrupted recording). If the desirable attributes lacking were related to the recording options, the interactive television application may be configured to modify the recording options based on the database entry that was modified when the program was identified as lacking desirable recording attributes prior to re-recording the program. For example, if the database entry indicates that the recorded program was cut off at the beginning or at the end, the interactive television application may modify the recording options to add a buffer at the beginning or at the end, respectively, If the video quality was too low, the interactive television application may modify the recording options to increase the video quality.

The original recorded program may be deleted before or after the program is re-recorded so that recording device 14, any other location within user equipment 10, or the network element outside of user equipment 10 may save space in memory. The deletion of the original recording may be in response to user instructions or automatic.

In another embodiment, recording device 14 may keep the original recording, and only record a portion of the re-transmission of the program. Recording device 14 may then be configured to insert the re-recorded portion into the original recording. This embodiment may be useful when the original recording was merely interrupted, or was missing the beginning or end of the program.

In the case where the recorded program that is lacking desirable recording attributes is an episode of a series, and the user has scheduled the recording of multiple episodes of the series, the recording options for the re-recording of the episode may be applied to all future episodes of the series scheduled for recording. The user may modify the recording options for the episodes of the series based on the modified options for the recorded program, or the interactive television application may automatically modify the recording options.

The interactive television application may be configured to detect patterns of recordings lacking desirable recording attributes to make global modifications. The interactive television application may search the database of recorded programs to find programs that have been identified as lacking desirable recording. The interactive television application may review the identified programs to detect whether several programs of a specific type (e.g., sports programs, news programs, programs on a specific channel, etc.) have been identified as lacking desirable recording attributes. The interactive television application may also use the database to identify the specific desirable attributes that are lacking. The interactive television application may search for programs scheduled to be recorded that are of the same type as the programs identified as lacking desirable recording attributes, and may modify the recording options for the scheduled programs to avoid recording the programs with desirable recording attributes lacking. For example, if several sports programs are marked as having low video quality, the interactive television application may modify the recording options of all subsequent sports programs scheduled for recording to increase the video quality. In some embodiments, the interactive television application may save the type of program and the specific desirable recording attributes lacking for future reference after the program identified as lacking desirable recording attributes has been deleted from memory. In some embodiments, the interactive television application may save the modifications made to the type of programs for future reference.

In some embodiments, the interactive television application may record a video-on-demand program locally, for example by downloading the program or by recording a copy as it is played. In some embodiments, the video-on-demand program may be recorded by recording device 14 with recording options specified by the user. Similarly to the embodiments with a broadcast program, when it is determined that the video-on-demand program lacks desirable recording attributes, the program may be identified, as described above. In response to the identification, the video-on-demand program may be re-recorded with the same or different recording options by instructing the system to re-download the video-on-demand program with the appropriate recording options, or by instructing the system to replay the video-on-demand program and recording it as it is received. The re-recording may be performed at the time the program is identified or at any other suitable time (for example when the user is not watching or recording other programs). It will be noted that any of the features described above in connection with the recording of a broadcast program may be applied to the recording of a video-on-demand program.

Figure 9:
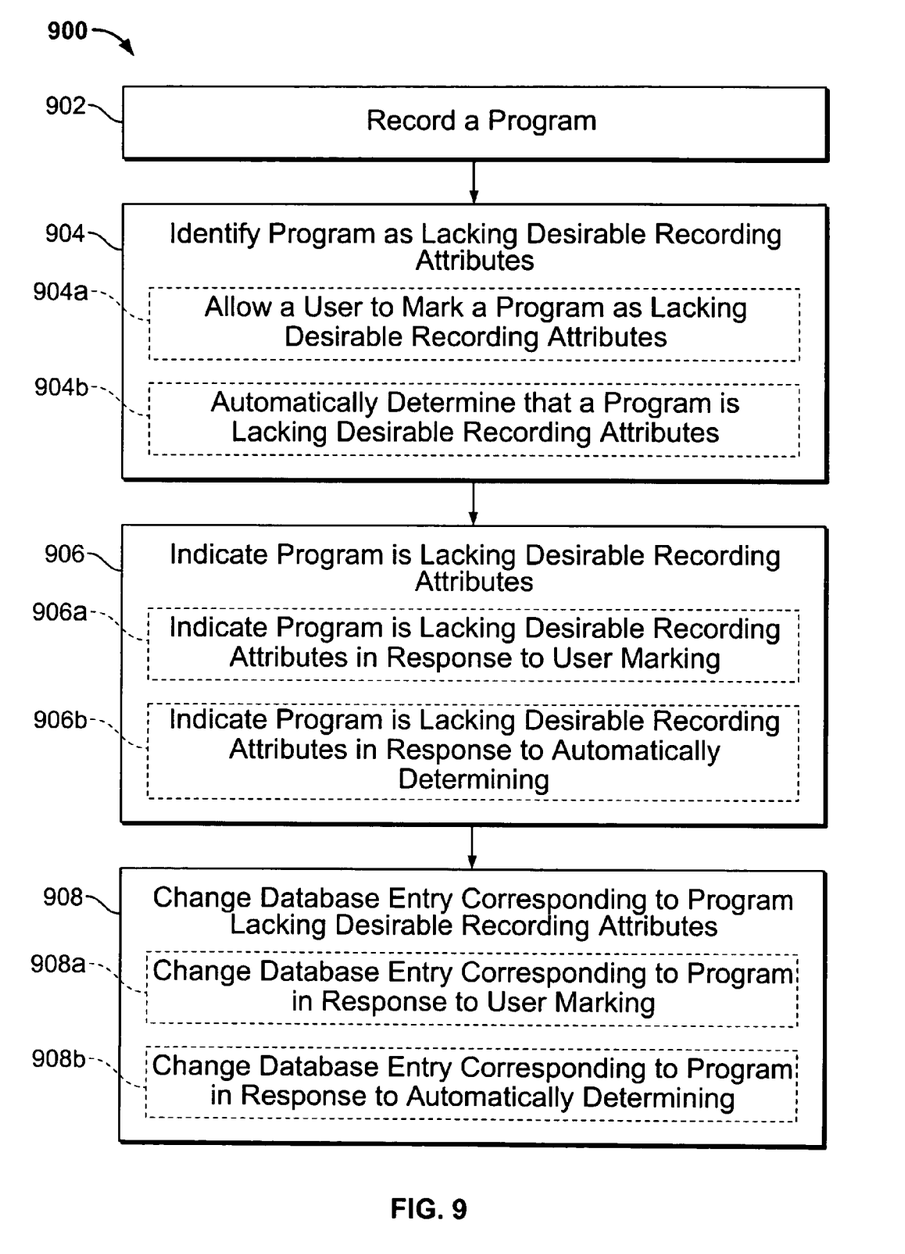
FIG. 9 shows a flow chart of illustrative steps for identifying a recorded program in accordance with one embodiment of the present invention.

FIG. 9 shows flow chart 900 describing a method for identifying recorded video programs as lacking desirable recording attributes in one embodiment of the present invention. At step 902, a user may schedule the recording of a program by a recording device, such as recording device 14. If a specific occurrence of the program is not specified, a specific occurrence of the program to be recorded may be selected based on some criteria, user-defined or automatically defined. For example, control circuitry 18 or the interactive television application may select the future occurrence of the program. The program may then recorded by the recording device. In another embodiment, the user may record a program downloaded as a video-on-demand program.

At step 904, the recorded program may be identified as lacking desirable recording attributes. The identification may be made in response to receiving a user marking (for example, after viewing the recorded program), as described in step 904a. Alternatively, the identification may be made automatically, as described in step 904b (e.g., by control circuitry 18 automatically determining that an incorrect program was recorded, or that the recording was interrupted due to a power loss or user manipulation of the tuner, etc.).

At step 906, the recorded program may be indicated as lacking one or more desirable recording attributes. The recorded program may be indicated in the listing of recorded programs, or in any other suitable place in the interactive television application. The indication may be made with any suitable marking such as, for example, a visual indication (e.g., an icon corresponding to the particular desirable recording attribute lacking) or an audio indication. The indication may be done in response to the user marking (e.g., by using input device 16), as shown by step 906a, or automatically (e.g., in response to instructions from control circuitry 18 and the automatic determining), as shown in step 906b.

At step 908, a database entry in a database (e.g., database 104) may be changed to reflect that the program was identified as lacking one or more desirable recording attributes. The database entry may include information regarding which desirable recording attributes are lacking, and may include information regarding the level to which the desirable recording attribute is not present. Information regarding the program and the desirable recording attribute that is lacking may be stored in memory 102 by control circuitry 18 executing instructions for the interactive television application for use with modifications of future programs scheduled for recording. The change in database entry may be done in response to the user marking (e.g., by using input device 16), as shown by step 908a, or automatically (e.g., in response to instructions from control circuitry 18 and the automatic determining), as shown in step 908b.

Figure 10:
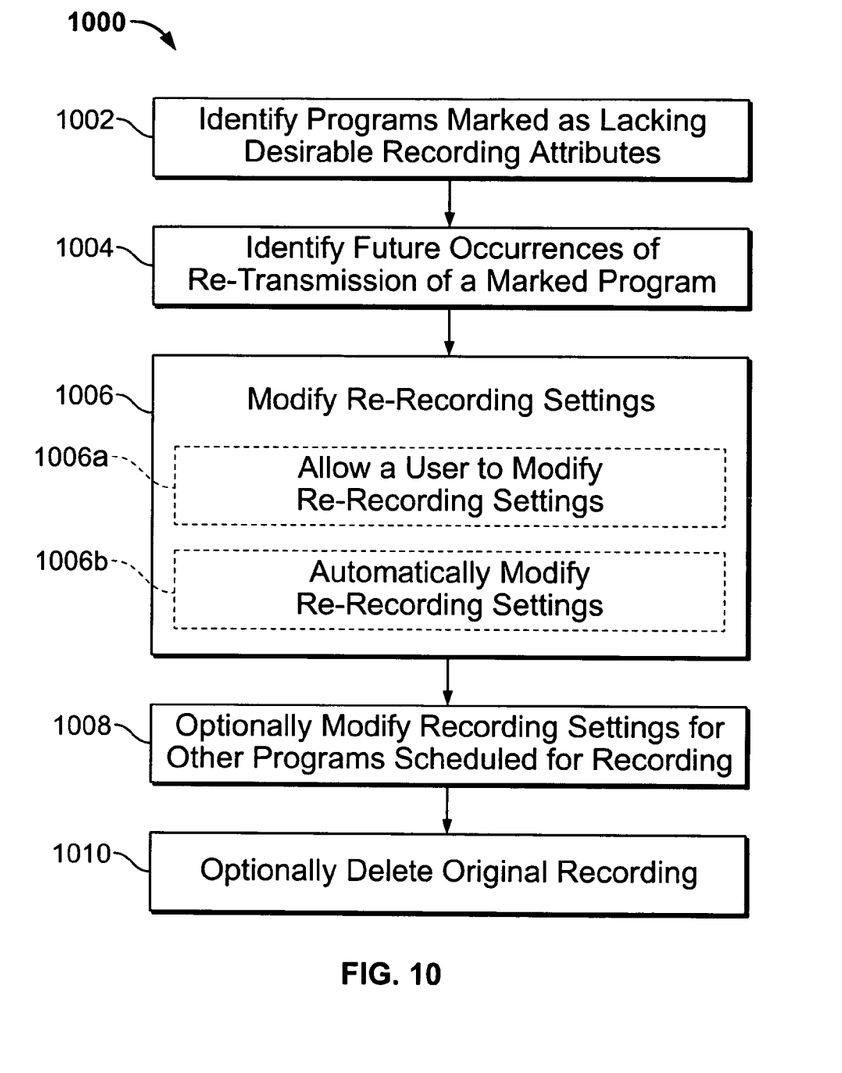
FIG. 10 shows a flow chart of illustrative steps for scheduling a re-recording and modifying re-recording options in accordance with one embodiment of the present invention.

FIG. 10 shows flow chart 1000 describing a method for re-recording an identified program in accordance with some embodiments of the present invention. At step 1002, the recordings identified as lacking desirable recording attributes may be reviewed (e.g., using control circuitry 14). At step 1004, one or more future occurrences of a re-transmission of a recorded program identified as lacking desirable recording attributes may be identified. For example, control circuitry 14 may search for the future occurrences based on identifiers or other data stored in a program guide database stored in memory. At least one re-transmission of the program may be selected and scheduled for re-recording. In another embodiment, the future transmission of the program that minimally impedes a user's use of the television system is selected for re-recording. In still another embodiment, if the program is a video-on-demand program, the program is re-recorded by re-downloading the video-on-demand program.

At step 1006, the recording options for the re-recording of the program may be modified. The recording options may be modified by a user (e.g., in response to user instructions received from input device 16), as described at step 1006a, or automatically (e.g., by the interactive television application), as described at step 1006b. The recording options may be modified in response to the database entry corresponding to the program identified as lacking desirable recording attributes (e.g., start time may be modified in response to a database entry identifying the start time as causing a lack of desirable recording attributes).

At step 1008, recording options for other future recordings may be optionally modified. The modification for other future recordings may be in response to user instructions, or automatic, similarly to the user-generated or automatic modifications of recording options for the particular program to be re-recorded. In one embodiment, the modification of re-recording options for the particular scheduled program may be applied by the control circuitry to all future programs scheduled for recording that are related to the particular program (e.g., episodes of a series, sports programs, news programs, programs on a specific channel, etc.). The recording options for all programs not related to the particular program may be maintained (e.g., not part of the series, programs of a different type).

At step 1010, the original recording may be deleted by the recording device to save space in memory. The recording may be deleted before or after the new recording is made. In some embodiments, only a portion of the original recording may be deleted, and the portions of the re-recording corresponding to the deleted portions of the original recording may be inserted and matched into the original recording. For example, control circuitry 18 may instruct the interactive television application to create a new copy of the program using the original recorded copy and the newly recorded portions.

The above described embodiments of the present invention are presented for purposes of illustration and not of limitation, and the present invention is limited only by the claims which follow.

What is claimed is:

1. A method for recording a video with an interactive television application, the method comprising:
    identifying a scheduled broadcast of the video on a publicly available content source;
    recording the scheduled broadcast of the video with the interactive television application on a recording device;
    automatically determining, from a detected user action, that the video lacks a desirable recording attribute, wherein a lack of the desirable recording attribute adversely affects a user's viewing of the video, and wherein the detected user action is selected from the group consisting of instructing the recording device to record an incorrect video, changing a channel of a tuner of the recording device while the video is being recorded, turning the recording device on after the scheduled broadcast of the video has started, turning the recording device off before the end of the scheduled broadcast of the video, specifying low audio quality for the recording of the video, specifying low video quality for the recording of the video, and performing any other user action that causes the desirable recording attribute to be lacking;
    in response to the determination, automatically selecting, with control circuitry, a future occurrence of a broadcast of the video; and
    automatically recording the future occurrence of the broadcast of the video on the recording device.

2. The method of claim 1 wherein determining that the video lacks a desirable recording attribute comprises receiving a user instruction to mark the video as lacking a desirable recording attribute.

3. The method of claim 1 further comprising:
    identifying a plurality of future occurrences of a broadcast of the video;
    identifying all scheduled future recordings;
    identifying the future occurrence of the broadcast of the video that minimally impedes the execution of all scheduled future recordings; and
    wherein automatically selecting a future occurrence of the video comprises automatically selecting the identified future occurrence that minimally impedes the execution of all scheduled future recordings.

4. The method of claim 1 further comprising modifying recording options for the re-recording of the future broadcast of the video.

5. The method of claim 4 wherein the recording options include a quality setting, a start time or an end time.

6. The method of claim 4 further comprising:
    storing in memory category information for the recorded video identified as lacking a desirable recording attribute;
    storing in memory the modifications to recording options made for the re-recording of the future broadcast of the video;
    comparing the category information of the recorded video with the category information of other videos selected to be recorded;
    identifying the selected videos that have the same category information as the recorded video; and
    modifying the recording options of the selected videos based on the modification of recording options made for the re-recording of the recorded video.

7. The method of claim 1 wherein a video lacking a desirable recording attribute comprises a video with incorrect program content, missing start or end of the program, interrupted recording, poor audio quality or poor video quality.

8. A system for recording a video with an interactive television application, the system comprising:
    a recording device configured to:
        identify a scheduled broadcast of the video on a publicly available content source; and
        record the scheduled broadcast of the video; and
    control circuitry configured to:
        automatically determine, from a detected user action, that the video lacks a desirable recording attribute, wherein a lack of the desirable recording attribute adversely affects a user's viewing of the video, and wherein the detected user action is selected from the group consisting of instructing the recording device to record an incorrect video, changing a channel of a tuner of the recording device while the video is being recorded, turning the recording device on after the scheduled broadcast of the video has started, turning the recording device off before the end of the scheduled broadcast of the video, specifying low audio quality for the recording of the video, specifying low video quality for the recording of the video and performing any other user action that causes the desirable recording attribute to be lacking;
        automatically select a future occurrence of a broadcast of the video in response to the determination; and
        direct the recording device to record the future occurrence of the broadcast of the video.

9. The system of claim 8 further wherein the control circuitry is further configured to receive a user instruction to mark the video as lacking a desirable recording attribute.

10. The system of claim 8 wherein the control circuitry is further configured to:
    identify a plurality of future occurrences of a broadcast of the video;
    identify all scheduled future recordings;
    identify the future occurrence of the broadcast of the video that minimally impedes the execution of all scheduled future recordings; and
    automatically select the identified future occurrence that minimally impedes the execution of all scheduled future recordings.

11. The system of claim 8 wherein the recording options for the re-recording of the future broadcast of the video are modified.

12. The system of claim 11 wherein the recording options include a quality setting, a start time or an end time.

13. The system of claim 11 wherein the control circuitry is further configured to:
- store in memory category information for the recorded video identified as lacking a desirable recording attribute;
- store in memory the modifications to recording options made for the re-recording of the future broadcast of the video identified as lacking a desirable recording attribute;
- compare the category information of the recorded video with the category information of other videos selected to be recorded;
- identify the selected videos that have the same category information as the recorded video; and
- modify the recording options of the selected videos based on the modification of recording options made for the re-recording of the recorded video.

14. The system of claim 8 wherein a video lacking a desirable recording attribute comprises a video with incorrect program content, missing start or end of the program, interrupted recording, poor audio quality or poor video quality.

* * * * *

UNITED STATES PATENT AND TRADEMARK OFFICE
CERTIFICATE OF CORRECTION

| | | |
|---|---|---|
| PATENT NO. | : 8,229,283 B2 | Page 1 of 1 |
| APPLICATION NO. | : 11/097566 | |
| DATED | : July 24, 2012 | |
| INVENTOR(S) | : Michael D. Ellis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1779 days.

Signed and Sealed this
Seventeenth Day of March, 2020

Andrei Iancu
*Director of the United States Patent and Trademark Office*